Jan. 3, 1950     R. S. EISNER     2,493,480
IMPLEMENT FOR APPLYING COATINGS
Filed Nov. 18, 1948     3 Sheets-Sheet 1
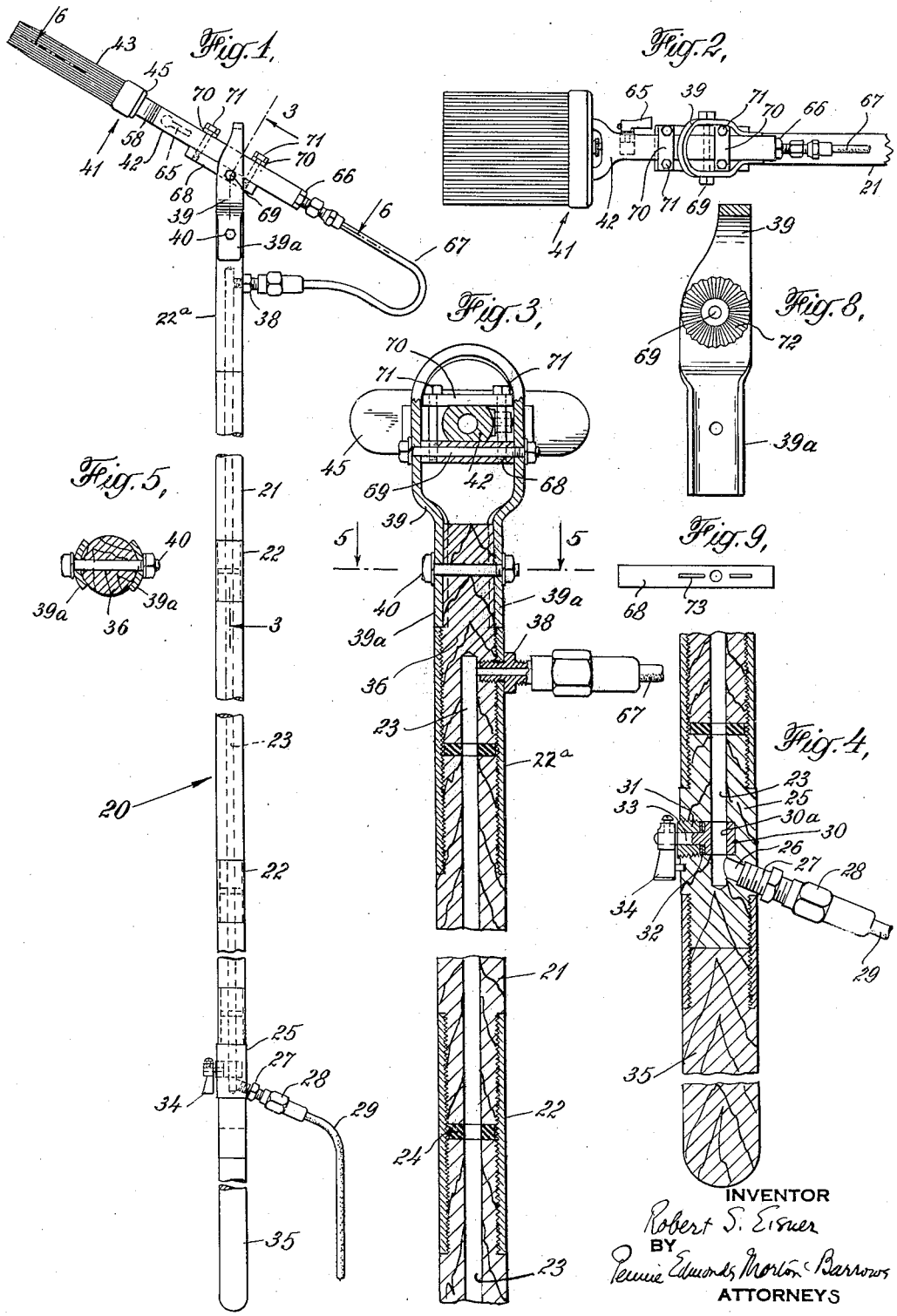

Jan. 3, 1950     R. S. EISNER     2,493,480
IMPLEMENT FOR APPLYING COATINGS
Filed Nov. 18, 1948     3 Sheets-Sheet 2

INVENTOR
Robert S. Eisner
BY
Penne Edmonds Morton Barrows
ATTORNEYS

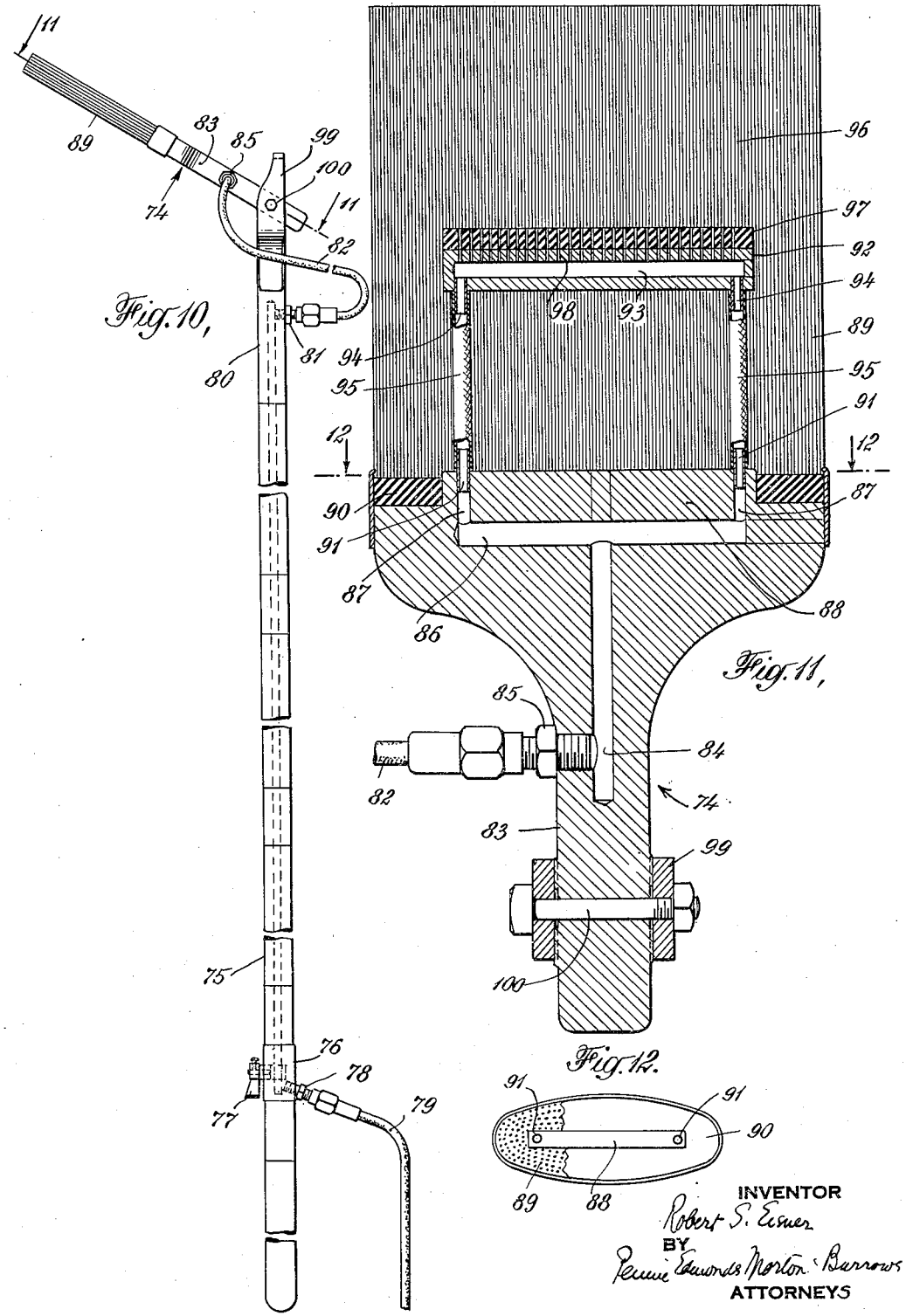

Patented Jan. 3, 1950

2,493,480

UNITED STATES PATENT OFFICE 2,493,480

IMPLEMENT FOR APPLYING COATINGS

Robert S. Eisner, Red Bank, N. J., assignor to Hanlon & Goodman Co., Belleville, N. J., a corporation of New York Application November 18, 1948, Serial No. 60,670

6 Claims. (Cl. 15—128)

This invention relates to an implement for applying liquid coating materials, such as paint, lacquers, etc., supplied thereto under pressure, to walls, ceilings, and other surfaces. More particularly, the invention is concerned with a novel implement, by means of which liquid coatings may be readily applied to surfaces at heights such that they can be reached by an operator wielding an ordinary hand brush, only when he stands on a ladder, scaffold, or other elevated support. The new implement can, accordingly, be used to advantage in painting high walls and ceilings, the outer surfaces of ships' hulls, poles, towers, and like objects.

The new implement includes an elongated stem, which is of light rigid material, such as wood or light metal tubing, and has a passage extending lengthwise through it. The stem is preferably made in sections, more or less of which may be used to vary the length of the stem, and it is provided near one end with a valve for controlling flow through the passage. At the other end, the stem has an outlet from the passage, and means for securing a brush thereto. The brush includes a handle with a passage therethrough, a body of bristles mounted at one end of the handle, and hollow distributing means attached to the end of the handle within the body of bristles with its interior in communication with the passage through the handle. The passage in the handle is connected to outlet of the stem passage by a flexible connection and the means for securing the brush to the stem may be adjusted, so that the brush may be held at different angles to the stem for most convenient use.

For a better understanding of the invention, reference may be made to the accompanying drawings, in which:

Fig. 1 is a view in side elevation of one form of the new implement;

Fig. 2 is a plan view of the implement of Fig. 1;

Fig. 3 is a sectional view on the line 3—3 of Fig. 1;

Fig. 4 is a sectional view on an enlarged scale of a part of the implement of Fig. 1;

Fig. 5 is a sectional view on the line 5—5 of Fig. 3;

Fig. 8 is a sectional view showing part of the brush holding means employed in the implement of Fig. 1;

Fig. 9 is a view in side elevation of another part of the holding means;

Fig. 10 is a view in elevation of a modified form of the implement;

Fig. 11 is a sectional view on an enlarged scale on the line 11—11 of Fig. 10; and Fig. 12 is a sectional view on a reduced scale on the line 12—12 of Fig. 11.

Figure 6:
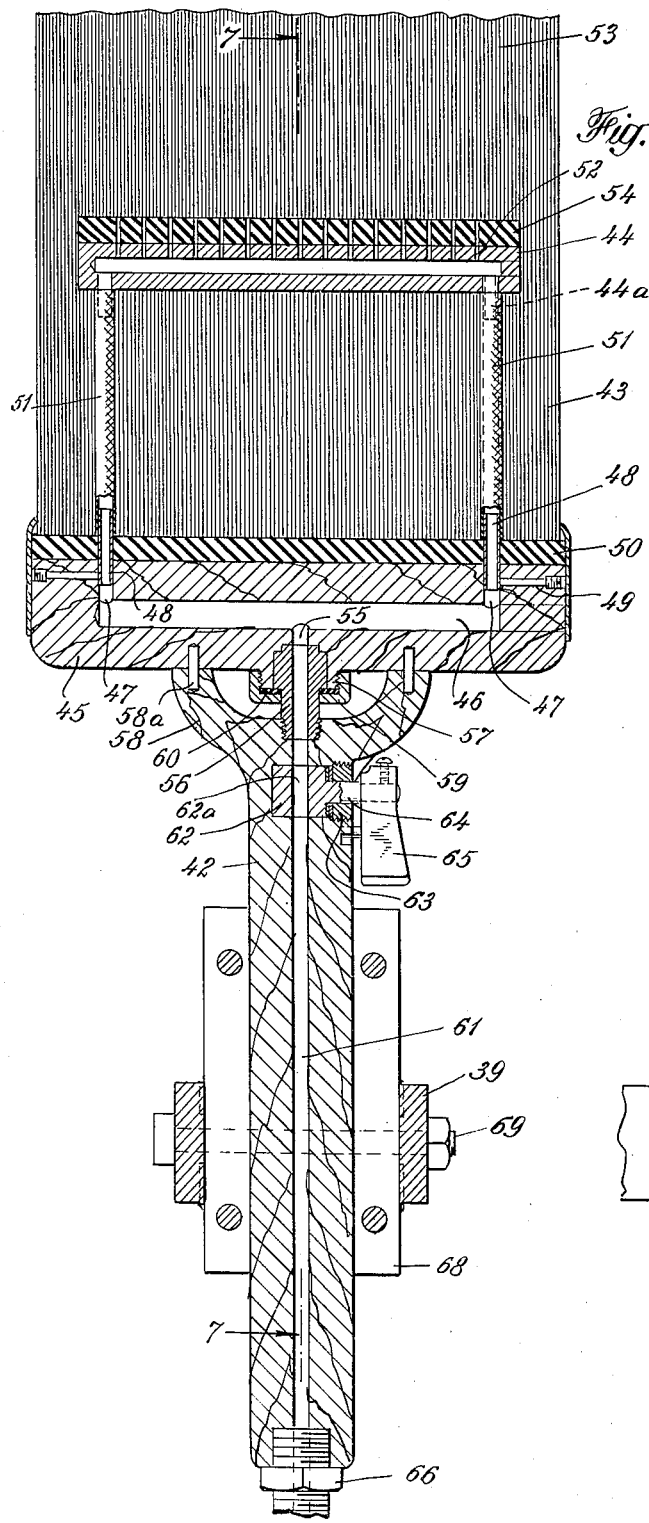
Fig. 6 is a sectional view on an enlarged scale through the brush, forming part of the implement of Fig. 1.
Figure 7:
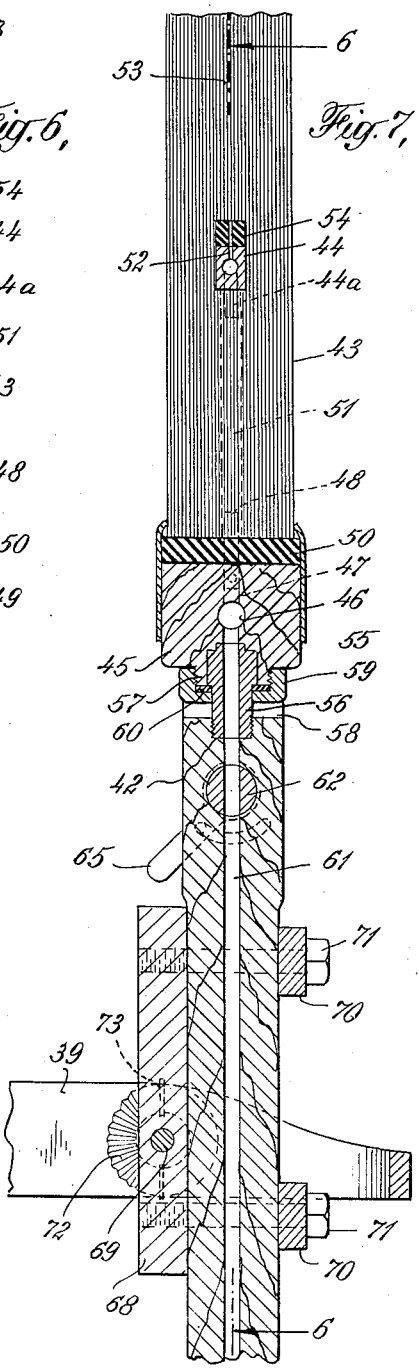
Fig. 7 is a sectional view on the line 7—7 of Fig. 6.

The implement in the form shown in Fig. 1 comprises a stem generally designated 20 and made of a suitable light stiff material, such as wood or light metal tubing. The stem is of a size such that it can be readily held in the hands and it is preferably made up of a number of sections 21 threaded at their ends and with adjacent sections connected together by an internally threaded sleeve 22 screwed on the ends of the sections. By using more or less sections, the stem may be given any desired length depending on the height of the surface on which the coating is to be applied. The stem has a passage for fluid 23 extending through it lengthwise and a gasket 24 of suitable compressible material is interposed between the ends of adjacent sections within sleeves 22 to make fluid-tight joints. When the stem is made of wood, the passage may be formed by a bore extending lengthwise thereof.

One of the stem sections 25 near one end of the stem is provided with an inlet passage 26 extending through the wall of the section into passage 23 and, preferably, a coupling member 27 is mounted permanently in the inlet passage, so that the inlet may be connected by a coupling 28 to a hose 29 leading to a source of the coating material maintained under pressure. A valve is mounted in section 25 of the stem just beyond the inlet 26 to control the flow through passage 23 and the valve includes a rotatable plug 30 seated in a socket in the wall of section 25 and held in place by an annular nut 31 threaded into the socket outside the plug. A gasket 32 is seated between the plug and the inner end of the nut and the plug is provided with a stem 33 which projects outwardly through the nut and carries a handle 34. The plug is formed with a diametrical passage 30a, which can be placed, upon rotation of the plug, in alignment with passage 23 to permit flow, or at an angle to the passage to control or shut off flow.

The stem preferably includes a solid section 35 secured to the valve section 25 and forming an end of the stem, upon which the implement may rest on the ground. At its other end, the stem is provided with a section 36 formed with an outlet passage leading through the wall of the section and through the sleeve 22a, by which the outlet section 36 is secured to the next adjacent section 21. A hollow coupling member 38 is threaded through sleeve 22a and into the outlet. Beyond sleeve 22a, a clamp 39 of loop form is mounted on section 36, the ends 39a of the clamp embracing the section at opposite sides and being held in place thereon by a bolt 40 passing through the ends of the clamp and section 36.

The implement shown in Fig. 1 includes a brush generally designated 41, which is held by clamp 39 and comprises a handle 42, a body of bristles 43 attached to one end of the handle and a hollow distributing member 44 attached to the handle and lying within the body of bristles. The brush may be of a type, such that it can be employed for coating purposes apart from the implement, and I prefer to use the brush disclosed in the copending application of Eisner and Schoenholz Serial No. 751,538, filed May 13, 1947, upon which Patent 2,454,553, issued on Nov. 23, 1948, of which I am one of the patentees.

The brush illustrated is of the construction disclosed in the copending application and it includes a base 45 having a transverse chamber 46 therein and passages 47 leading from the ends of the chamber to the outer face of the base. Short lengths 48 of rigid tubing are mounted in passages 47 and extend beyond the outer face of the base, the tubes 48 being held in place by set screws 49. The inner ends of bristles 43 are embedded in a body 50 of rubber or like material, which is affixed to the outer face of base 45, and within the group of bristles is a hollow distributing member 44. The member has inlet openings in which are mounted short rigid tubes 44a connected to the tubes 48 by flexible tubes 51. The distributing member is formed with a plurality of outlet passages 52 in its outer face and an inner brush, comprising a group of bristles 53 having their inner ends embedded in a body 54 of rubber or like material, is attached to the outer face of the member 44. The body of rubber has openings through it in alignment with passages 52.

The base 45 of the brush is formed with an inlet passage 55, which opens into a recess receiving the end of a coupling member 56 threaded into the end of handle 42. The base is formed with an outwardly projecting flange 57 encircling the mouth of the recess, the flange being externally threaded. The handle 42 of the brush has a bifurcated end, each leg 58 of which carries a pin 58a receivable in an opening in the base 45. When the handle is to be attached to the base of the brush, the coupling member 56 is passed through flange 57 into the socket in the base and the pins 58a enter their recesses in the base. An annular nut 59 mounted on the coupling member behind a shoulder thereon is then threaded on flange 57 to hold the coupling member in the socket. A gasket 60 is interposed between the nut and the end of the flange and the shoulder on the coupling member.

The coupling member 56 has a passage therethrough in communication with a passage 61 extending through the handle from end to end. Flow through passage 61 is controlled by a valve, which comprises a plug 62 seated in a socket in the handle and having a diametrical passage 62a, which, upon rotation of the plug, may be aligned with passage 61 or placed at an angle thereto. The plug 62 is held in place by an annular nut 63 threaded into the socket in the handle and has a stem 64 extending through the nut and carrying a handle 65, by which the plug can be rotated. At the free end of handle 42, a coupling member 66 is threaded in place in alignment with passage 61 and the coupling members 66 on the handle and 38 on section 36 of the stem are connected by suitable coupling means to a flexible hose 67. The valve on the handle of the brush is employed only when the brush is used apart from the stem and when the brush is mounted on the stem, the valve on the brush handle is left open at all times and flow through the brush is controlled by the valve on the stem.

The means for securing the brush to the end of the stem in clamp 39 comprises a plate 68, which is mounted between the sides of clamp 39 and held in place by a bolt 69 passing through the plate and clamp. A pair of bars 70 rest on top of the handle and are connected to the plate 68 by bolts 71, which can be tightened to clamp the handle on the plate. The inner face of one of the sides of clamp 39 is provided with a plurality of grooves 72 extending radially from the opening, through which bolt 69 passes, and plate 68 is formed with a pair of ribs 73 on opposite sides of the opening through the plate for the bolt. When the nut on the bolt 69 is backed off, the plate 68 with the brush rigidly attached thereto may be swung to place its ribs in selected notches 72, so that the brush lies at the desired angle to the stem. When the nut on bolt 69 is tightened, the plate and brush are then firmly held in the desired relation to the stem.

In the use of the implement so far described, the tube 29 is connected to a tank containing a source of coating under pressure, the valve in the stem being initially closed and the valve in the brush handle being open. When the operator opens the stem valve, the coating material flows from the tank through the passage 23 in the stem to the outlet and thence through the flexible hose connection 67 to the passage 61 through the brush handle. The fluid then flows through passage 61 into chamber 46 and thence into the interior of the distributing member 44. The fluid issues from the distributing member through passages 52, which lie between the bristles of the inner brush. The length of the flexible tubing 51 is such that the distributing member lies well out toward the free ends of the body of bristles 43 and, as the bristles are flexed, as the brush is moved over the surface to be coated, the fluid discharged among the bristles 53 of the inner brush escapes therefrom and into the bristles 43 near the ends thereof. Because of the discharge of the coating material among the bristles of the inner brush at a relatively short distance from the free ends of the bristles 43, the coating material can be applied to a vertical or overhead surface without leaking of the material from among the bristles 43.

The implement may be employed to coat surfaces at a height above the operator, which depends on the length of the stem, and, since the stem is of relatively light material, an implement with a stem as long as fifteen feet or more may be readily manipulated by the operator. By means of the stem valve, he can control the rate of flow, so that the coating material is supplied to the brush at about the same rate that it is applied to the surface and, since the fluid is continuously supplied to the brush under pressure, the coating operation can be carried on without interruption for dipping the brush into a vessel containing the coating material.

The implement shown in Figs. 10 to 12, inclusive, is similar to that above described, except that the brush generally designated 74 is not intended for use apart from the implement and may thus be of simplified construction. The second form of the implement includes a stem 75 of sectional construction having a lengthwise passage through it and an inlet section 76. Section 76 is provided with a valve operable by a handle 77 and within the inlet is a coupling member 78, which can be coupled to a hose 79 leading to a source of coating material under pressure. Stem 75 has a section 80 provided with an outlet with a coupling member 81, which can be coupled to a flexible connection 82.

The brush has a handle 83 formed with a passage 84 extending lengthwise through it and a coupling member 85 is mounted in an inlet to passage 84 and is coupled to connection 82. The brush handle has an enlarged end containing a transverse chamber 86, to which passage 84 leads, and the chamber has outlet passages 87 at its ends leading through a central extension 88 from the face of the enlarged end of the handle. A body of bristles 89 have their inner ends embedded in a block 90 of rubber or like material and the block is secured to the face of the handle around the central extension 88 therefrom. The passages 87 lead through the extension 88 and short rigid tubes 91 are mounted in the passages. A distributing member 92 is mounted within the group of bristles 89 at a distance from the end of extension 88 and the distributing member has a central chamber 93 with inlet openings in which short rigid tubes 94 are inserted. Aligned tubes 91 and 94 are connected by flexible tubes 95. An inner brush comprising bristles 96 having their inner ends embedded in a body 97 of rubber or like material is affixed to the outer face of the distributing member 92 and the outer wall of the member is formed with a plurality of outlet passages 98, which are aligned with similar passages through the block 97. Fluid supplied to passage 84 in the handle 83 flows into chamber 86 and thence through flexible tubes 95 into chamber 93 in the distributing member. The fluid then escapes through passages 98 and is discharged among the bristles 96 of the inner brush.

The stem 75 is provided at the end of the outlet section 80 with a clamp 99, between the legs of which the stem 83 of the brush handle may be inserted to be held in place by a bolt 100 passing through aligned openings in the sides of the clamp and the handle. The inner face of one or both sides of the clamp may be provided with radial channels similar to channels 72 (Fig. 8) and the side of the brush handle may be provided with fins similar to fins 73 for reception in the channels. With this arrangement, the brush 74 may be placed at any desired angle with relation to the stem and then held rigidly in position when the nut on bolt 100 is tightened.

The operation of the implement in Figs. 10 to 12 is similar to that previously described. Control of flow through the stem to the brush is effected by means of the stem valve operated by handle 77 and the fluid flows through the passage and chamber in the handle and through flexible tubes 95 into the interior of the distributing member 92. The fluid is discharged among the bristles 96 of the inner brush and when the bristles 89 of the brush are flexed as they are moved over the surface to be coated, the flexible tubes 95 also bend, so that the bristles 96 of the inner brush take the same curve as bristles 89. Fluid supplied to the inner brush escapes therefrom and enters among the bristles 89 near the outer ends thereof. With this construction, there is no discharge of the fluid through the sides of the body of bristles 89, even though the implement is used for coating overhead surfaces.

I claim:

1. An implement for applying liquid coating materials supplied thereto under pressure, which comprises a rigid elongated stem having a passage extending lengthwise thereof, the passage having an inlet and an outlet near opposite ends of the stem, a valve mounted on the stem near the inlet and operable to control flow through the passage, the valve having an operating member exposed at the side of the stem, a brush at the end of the stem adjacent the outlet, the brush including a handle having a passage through it, a body of bristles secured to one end of the handle, and hollow distributing means attached to said end of the handle within the body of bristles with its interior in communication with the handle passage, adjustable means rigidly attached to the stem for securing the brush handle to the stem to extend at a selected angle thereto, and a flexible hose connection between the outlet of the stem passage and the handle passage.

2. An implement for applying liquid coating materials supplied thereto under pressure, which comprises an elongated stem having a passage extending lengthwise through it, the passage having an inlet and an outlet through the side wall of the stem and spaced along the stem, a valve mounted in the passage near the inlet and having an operating member exposed at the outside of the stem, a brush at the end of the stem adjacent the outlet, the brush including a handle having a passage extending from end to end thereof, a body of bristles secured to one end of the handle, and hollow distributing means attached to said end of the handle within the body of bristles with its interior in communication with the handle passage at one end thereof, means for securing the brush handle to the stem to extend at an angle thereto, and a connection between the other end of the handle passage and the stem passage outlet.

3. An implement for applying liquid coating materials supplied thereto under pressure, which comprises an elongated stem having a passage extending lengthwise through it, the passage having an inlet and an outlet through the side wall of the stem and spaced along the stem, a coupling member in the outlet, a valve mounted in the passage near the inlet and having an operating member exposed at the outside of the stem, a brush at the end of the stem adjacent the outlet, the brush including a handle having a passage through it leading through one end of the handle, a body of bristles secured to the handle at said end, and a hollow distributing means attached to the handle at said end within the body of bristles with its interior in communication with the handle passage, means for securing the brush handle to the stem to extend at an angle to the stem, and a flexible hose connection between the coupling member and the handle passage.

4. An implement for applying liquid coating materials supplied thereto under pressure, which comprises a rigid elongated stem having a passage extending lengthwise thereof, a valve mounted on the stem near one end thereof and operable to control flow through the passage, a brush at the other end of the stem, the brush including a base having a passage through it, a body of bristles secured to the base, and hollow distributing means attached to the base and lying within the body of bristles, said distributing means being in communication with one end of the passage through the base, a mounting for the brush attached rigidly to the stem at the end remote from the valve, the mounting being adjustable to hold the brush in selected angular positions relative to the stem, and a flexible hose connection between the other end of said passage through the base and the adjacent end of the passage lengthwise of the stem.

5. An implement for applying liquid coating materials supplied thereto under pressure, which comprises a rigid elongated stem having a passage extending lengthwise thereof, a valve mounted on the stem near one end thereof and operable to control flow through the passage, a brush at the other end of the stem, the brush including a base having a passage through it, a body of bristles secured to the base, and hollow distributing means attached to the base and lying within the body of bristles, said distributing means being in communication with one end of the passage through the base, means rigidly attached to the stem at the end remote from the valve and engaging part of the brush base for securing the brush in selected angular positions relative to the stem, and a flexible hose connection between the other end of said passage through the base and the adjacent end of the passage lengthwise of the stem.

6. An implement for applying liquid coating materials supplied thereto under pressure, which comprises a rigid elongated stem having a passage extending lengthwise thereof, a valve mounted on the stem near one end thereof and operable to control flow through the passage, a brush at the other end of the stem, the brush including a base having a passage through it, the base having an extension from one side thereof, a body of bristles secured to the opposite side thereof, and hollow distributing means attached to the base and lying within the body of bristles, said distributing means being in communication with one end of the passage through the base, a mounting for the brush attached rigidly to the stem at the end remote from the valve, the mounting being attached to the extension on the base and being adjustable to hold the brush in selected angular positions relative to the stem, and a flexible hose connection between the other end of said passage through the base and the adjacent end of the passage lengthwise of the stem.

ROBERT S. EISNER.

REFERENCES CITED

The following references are of record in the file of this patent:

UNITED STATES PATENTS

| Number | Name | Date |
|---|---|---|
| 1,465,856 | Marsh | Aug. 21, 1923 |
| 2,041,173 | Fairchild | May 19, 1936 |